United States Patent
Campbell et al.

(10) Patent No.: US 10,133,719 B2
(45) Date of Patent: Nov. 20, 2018

(54) SPREADSHEET WORKBOOK PART LIBRARIES

(75) Inventors: Johnny Sterling Campbell, Renton, WA (US); Eran Megiddo, Bellevue, WA (US); Robert George Hawking, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1527 days.

(21) Appl. No.: 11/864,219

(22) Filed: Sep. 28, 2007

(65) Prior Publication Data

US 2009/0089067 A1    Apr. 2, 2009

(51) Int. Cl.
G06F 17/24    (2006.01)
G06Q 10/10    (2012.01)

(52) U.S. Cl.
CPC .......... *G06F 17/246* (2013.01); *G06F 17/243* (2013.01); *G06F 17/245* (2013.01); *G06Q 10/10* (2013.01)

(58) Field of Classification Search
CPC .... G06F 17/246; G06F 17/243; G06F 17/245; G06Q 10/10
USPC ................. 715/212, 234, 227, 213
See application file for complete search history.

(56) References Cited

U.S. PATENT DOCUMENTS

| | | | |
|---|---|---|---|
| 5,339,410 A * | 8/1994 | Kanai ...................... G06F 8/41 | |
| 6,134,563 A * | 10/2000 | Clancey et al. ............ 715/210 | |
| 6,157,934 A | 12/2000 | Khan et al. | |
| 6,199,078 B1 * | 3/2001 | Brittan .................. G06F 17/246 | |
| | | | 715/234 |
| 6,317,758 B1 * | 11/2001 | Madsen et al. ............... 715/220 | |
| 6,327,592 B1 * | 12/2001 | Yoshikawa ........... G06F 17/246 | |
| 6,523,167 B1 * | 2/2003 | Ahlers et al. ................ 717/100 | |
| 6,631,497 B1 | 10/2003 | Jamshidi et al. ............. 715/514 | |
| 6,988,241 B1 | 1/2006 | Guttman et al. ............. 715/503 | |
| 7,155,665 B1 | 12/2006 | Browne et al. .............. 715/503 | |
| 7,155,667 B1 | 12/2006 | Kotler et al. ................ 715/513 | |
| 7,165,214 B2 | 1/2007 | Ishizaka ....................... 715/503 |

(Continued)

FOREIGN PATENT DOCUMENTS

| | | |
|---|---|---|
| CN | 1794224 A | 6/2006 |
| JP | 2007-193549 A | 8/2007 |

OTHER PUBLICATIONS

"BabBlue XLmerge", http://badblue.com/prodxlm.htm, Downloaded from Internet Jul. 16, 2007, 2 pages.

(Continued)

*Primary Examiner* — Thu Huynh
(74) *Attorney, Agent, or Firm* — Merchant & Gould

(57) ABSTRACT

Disclosed are systems and methods that enable a workbook author to break a workbook out into a set of logically separate pieces, referred to herein as "workbook parts." Calculation dependencies between the workbook parts may be maintained, so that all the calculations are correct across the entire spreadsheet. An organization may be enabled to manage each workbook part separately, thus certain users may be denied access to view or edit certain workbook parts. Accordingly, where multiple authors are contributing to a tightly controlled workbook, the person responsible for spreadsheet management is enabled to allow each of those authors access to edit only the portion that they need to be concerned with.

18 Claims, 5 Drawing Sheets

(56) References Cited

U.S. PATENT DOCUMENTS

| | | | |
|---|---|---|---|
| 7,233,951 B1 | 6/2007 | Gainer et al. | 707/10 |
| 7,581,165 B2* | 8/2009 | Cho et al. | 715/200 |
| 7,617,443 B2* | 11/2009 | Mills et al. | 715/212 |
| 7,617,444 B2* | 11/2009 | Rothschillwe et al. | 715/213 |
| 7,853,868 B2* | 12/2010 | Weber et al. | 715/212 |
| 7,882,427 B2* | 2/2011 | Raja et al. | 715/212 |
| 2002/0007380 A1* | 1/2002 | Bauchot et al. | 707/530 |
| 2002/0010743 A1 | 1/2002 | Ryan et al. | 709/205 |
| 2002/0049784 A1* | 4/2002 | Bauchot | G06F 17/246 715/212 |
| 2002/0091728 A1* | 7/2002 | Kjaer et al. | 707/503 |
| 2002/0091730 A1* | 7/2002 | Bedford et al. | 707/503 |
| 2002/0138527 A1 | 9/2002 | Bell et al. | |
| 2002/0188629 A1* | 12/2002 | Burfoot | 707/503 |
| 2003/0110191 A1* | 6/2003 | Handsaker | G06F 17/246 715/212 |
| 2003/0163519 A1* | 8/2003 | Kegel et al. | 709/203 |
| 2004/0148566 A1* | 7/2004 | Jaffar et al. | 715/503 |
| 2005/0144036 A1* | 6/2005 | Bell et al. | 705/1 |
| 2005/0267853 A1* | 12/2005 | Netz | G06F 17/30592 |
| 2005/0268215 A1* | 12/2005 | Battagin et al. | 715/503 |
| 2005/0268753 A1 | 12/2005 | Lin | 81/177.9 |
| 2006/0041832 A1 | 2/2006 | Cho et al. | |
| 2006/0047711 A1* | 3/2006 | Cho et al. | 707/201 |
| 2006/0061699 A1 | 3/2006 | Kirsch et al. | 349/24 |
| 2006/0136433 A1* | 6/2006 | Rothschiller | G06F 17/2247 |
| 2006/0136808 A1 | 6/2006 | Chirilov | |
| 2006/0136816 A1 | 6/2006 | Jones | |
| 2006/0161577 A1* | 7/2006 | Kulkarni | H04L 67/1008 |
| 2006/0161884 A1* | 7/2006 | Lubrecht et al. | 717/104 |
| 2006/0274086 A1 | 12/2006 | Forstall et al. | 345/629 |
| 2007/0011169 A1* | 1/2007 | Parisi | G06Q 10/10 |
| 2007/0022128 A1 | 1/2007 | Rothschiller et al. | 707/100 |
| 2007/0033093 A1* | 2/2007 | Divine et al. | 705/10 |
| 2007/0038924 A1* | 2/2007 | Beyer et al. | 715/507 |
| 2007/0061698 A1 | 3/2007 | Megiddo et al. | 715/503 |
| 2007/0106705 A1* | 5/2007 | Chalana | G06F 17/30536 |
| 2007/0136653 A1* | 6/2007 | Khen et al. | 715/503 |
| 2007/0208992 A1 | 9/2007 | Koren | |
| 2007/0219956 A1* | 9/2007 | Milton | 707/3 |
| 2007/0220415 A1* | 9/2007 | Cheng | G06F 17/246 715/212 |
| 2008/0028287 A1* | 1/2008 | Handsaker et al. | 715/212 |
| 2008/0034281 A1* | 2/2008 | Handsaker et al. | 715/219 |
| 2008/0222507 A1* | 9/2008 | Nguyen | G06F 17/2211 715/212 |
| 2008/0229184 A1* | 9/2008 | Prish et al. | 715/212 |
| 2008/0244377 A1* | 10/2008 | Erwig et al. | 715/212 |
| 2009/0089653 A1* | 4/2009 | Campbell et al. | 715/209 |
| 2011/0078114 A1* | 3/2011 | Herbeck et al. | 707/638 |

OTHER PUBLICATIONS

Khor, S.M., "Microsoft Office Excel 2003 Preview", http://msdn2.microsoft.com, Jun. 2003, 15 pages.

Whitehead E.J. et al., "A Proposal for Versioning Support for the Chimera System", http://cs-people.bu.edu/dgd/workshop/whitehead.html, Downloaded for the Internet Jul. 16, 2007, 9 pages.

DeAgostini, K.K., "Creating Product Management Sheet, How to data share and analyze?" Weekly Easy PC, vol. 3, No. 65, pp. 65-7 to 65-11, Jun. 22, 1999, Japan.

Japanese Patent Application No. 2010-527243: Notice of Rejection dated Jan. 18, 2013, 2 pages.

"First Office Action Issued in Indian Patent Application No. 01779/CHENP/2010", dated Dec. 27, 2017, 5 Pages.

"Office Action Issued for Korean Patent Application No. 10-2010-7006095", dated Feb. 6, 2015, 11 Pages.

PCT International Search Report and Written Opinion in International Application PCT/US2008/078154, dated Mar. 31, 2009, 11 pages.

PCT International Preliminary Report on Patentability in International Application PCT/US2008/078154, dated Jan. 8, 2010, 8 pages.

Indian Office Action in Application 1779/CHENP/2010, dated Dec. 27, 2017, 5 pages.

European Office Action in Application 08833918.9, dated Jun. 25, 2013, 7 pages.

European Summons to Attend Oral Proceedings in Application 08833918.9, dated Feb. 13, 2014, 7 pages.

European Search Report in Application 08833918.9, dated Mar. 27, 2012, 6 pages.

Chinese 1st Office Action in Application 200880109400.9, dated Oct. 17, 2011, 10 pages.

Chinese 2nd Office Action in Application 200880109400.9, dated May 25, 2012, 6 pages.

Chinese 3rd Office Action in Application 200880109400.9, dated Jan. 22, 2013, 11 pages.

Chinese Notice of Allowance in Application 200880109400.9, dated Apr. 3, 2013, 6 pages.

Japanese Notice of Allowance in Application 2010-527243, dated Oct. 15, 2013, 4 pages.

* cited by examiner

SPREADSHEET WORKBOOK PART LIBRARIES

BACKGROUND

Often, it may be desirable for the calculations in a spreadsheet to be protected such that, for example, the calculations are accessible or viewable by only certain users. For example, for corporate compliance reasons, an organization may wish to know who updated a spreadsheet, what they did, and when they did it. Thus, such an organization may want the spreadsheet to be part of its "document management solution" so that the organization can control access to it.

A customer may want to allow the reuse of a portion of a spreadsheet, i.e., to share the calculation and results from that portion of the spreadsheet only, and not the entire spreadsheet. This is more than just viewing, as it actually exposes the data and calculations. This would enable another spreadsheet author to copy, or reuse, the results in their own spreadsheet. Currently, customers need to allow access to an entire spreadsheet to do this, which may not be desirable from a management and control perspective.

A customer may want to allow multiple users to edit a single spreadsheet. Some of the users may be offline when they edit, and some may be online. Such users may wish to be able to edit their portion of the spreadsheet, regardless of who else may be editing the file at that time. Currently, users are forced to take turns collaborating on a spreadsheet because, in most document management systems, only a single person can "check out" a file and edit it. Other users must wait until it is "checked in" to edit it.

And, even though it may be desirable to tightly manage a spreadsheet, it may also be desirable for the results from it to be viewed widely across an organization. For example, an organization may wish to allow certain employees to see a chart or table from a spreadsheet, but not to allow them to edit the spreadsheet, or even open it to see the calculations that were used to generate those views of the data. Though this is currently possible in some systems, it is possible only at the file level. There is no notion of allowing different users access to different parts of the same workbook.

Another thing that customers often do is to create a "dashboard." A dashboard may be defined as a page where many objects (e.g., charts, tables, graphs, etc.) are assembled together to visually and holistically indicate the status of a project, business, or other organization. Currently, users need to open a spreadsheet and hand pick all the items that they want to assemble into a dashboard. This can be a tedious and sometimes, e.g., for large spreadsheets, difficult task.

SUMMARY

Disclosed are systems and methods that enable a workbook author to break a workbook out into a set of logically separate pieces, referred to herein as "workbook parts." Calculation dependencies between the workbook parts may be maintained, so that all the calculations are correct across the entire spreadsheet. Such workbook parts may be stored separately in a special directory (or document library on a document management server). Each workbook part may be separately subject to all the document management policies of the document management server.

Customers may be enabled to manage each workbook part separately. This provides them with a way to deny users access to even view certain workbook parts. It also affords them the ability to enable certain users to edit only the parts of a spreadsheet (i.e., the individual workbook part) that they should be able to edit. Accordingly, where multiple authors are contributing to a tightly controlled workbook, the person responsible for spreadsheet management is enabled to allow each of those authors access to edit only the portion that they need to be concerned with, by exposing it as a workbook part.

By allowing a user access to only a portion of the spreadsheet, that user can open that portion and copy the data and logic into their own spreadsheet. Alternatively, they could choose a set of workbook parts they have access to, and port them all over into a completely new spreadsheet. This allows data and calculation reuse without needing to expose an entire spreadsheet.

Because the spreadsheet is broken up into a set of workbook parts and stored as part of a document management system, users no longer have to take turns "checking out" the entire spreadsheet file. They can now check out and edit only the discrete portions of the spreadsheet they need to. Since it is common for people to "own" editing "their" portion of a spreadsheet, this effectively solves most collaboration scenarios. Because each workbook part can be checked out, it is also possible to take that workbook part offline and make edits. When it comes back online, the rest of the spreadsheet, and other users, will get the updated results. This makes collaboration between users that are on and offline possible, while avoiding the issues and logic that are typically required to merge results.

As each workbook part may be stored separately in the document management server, each workbook part may have different permissions applied to it. Thus, some users may be granted permissions to view some workbook parts but not others, even though all workbook parts might belong to the same spreadsheet. This effectively solves the problem of granting multiple users different permissions to objects that are contained in the same workbook.

Given a workbook that can be broken into workbook parts, a dashboard may be assembled by "picking" the workbook part(s) to be included in the dashboard, and clicking a single command to "create dashboard."

DETAILED DESCRIPTION

Figure 1:
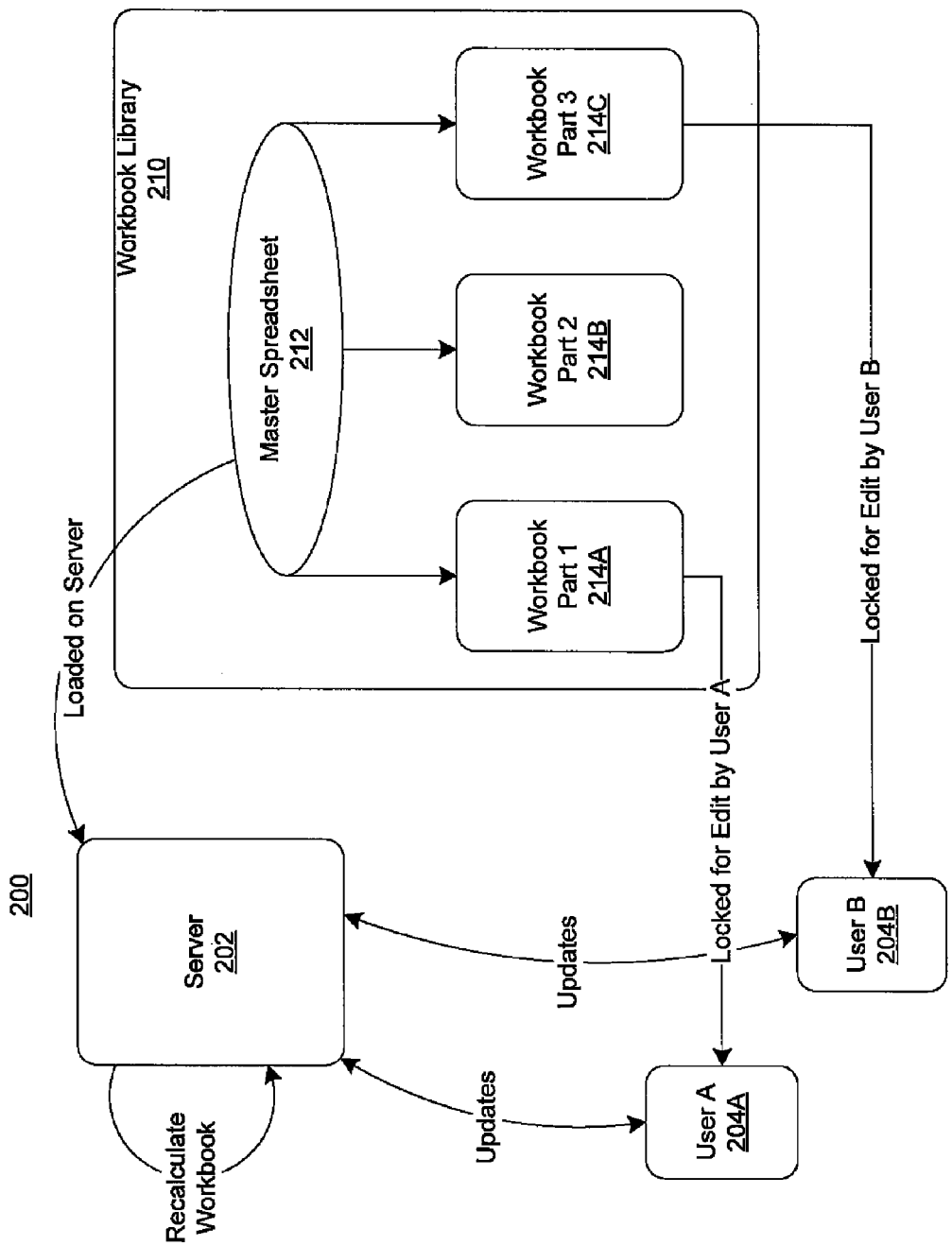
FIG. 1 is a block diagram of a first embodiment of a system for providing spreadsheet workbook part libraries.

FIG. 1 is a block diagram of a system 200 for providing spreadsheet workbook part libraries. As used herein in connection with a spreadsheet, the term "workbook part" may refer to any discrete object from a spreadsheet. Examples of such objects include named ranges (which may be contiguous single-cell or multi-cell ranges), charts, tables (a.k.a., lists), pivot tables, single sheets, or any other logically distinct spreadsheet objects.

As shown, a workbook library 210 may be created for the purpose of managing one or more workbook parts 214A-C. The library 210 may be a directory or special document library on a document management server, for example. The library 210 may store each workbook part 214A-C, and a master spreadsheet 212, as separate entries. The library 210 may be organized so that each master spreadsheet 212 and its dependent workbook parts 214A-C are stored in separate directories, though they may be stored in the same directory. The library 210 may also enforce permissions on each workbook part 214A-C separately, as well as locking each workbook part 214A-C for editing separately (e.g., check in/check out). The library 210 may also contain a user interface ("UI") and logic for editing or opening a workbook part 214A-C in a client or server application, for combining workbook parts 214A-C to make a new spreadsheet, and/or for creating a dashboard from one or more workbook parts 214A-C.

The library 210 may provide UI that allows one or more users 204A-B to select a single workbook part 214A-C for viewing or editing using either a client application or spreadsheet server application. When a user 204A-B opens a workbook part 214A-C in a spreadsheet application, the most recent values are taken from the master workbook 212 for that workbook part 214A-C. That is, when a workbook part 214A-C is opened, it may contain the most up-to-date values. Depending on how the calculation dependencies are implemented, this may mean that values are updated in the master spreadsheet 212 on upload of the edited workbook part 214A-C to the server 202. The values of the workbook part 214A-C may always be updated on download from the server 202. This update code could run on the client or server.

The data required to render or manipulate an object may travel with the object as part of the workbook part. So, in the case of a chart or pivot, any associated data cache may become part of the workbook part. If multiple charts or pivots are based off of the same data cache, each may get its own copy. In the case of a table, named range, or sheet, the spreadsheet grid may contain all the necessary data. Note that there are special cases like query tables or OLAP formulas where there may be an external data cache. In these cases, the cache may be encapsulated with the workbook part as well.

Logic may be provided to encapsulate a workbook part's calculation dependencies. Some workbook parts may contain calculation (e.g., formula) dependencies on other parts of the spreadsheet, or other workbook parts. A master copy of the original spreadsheet may be maintained. A table of all the workbook parts may be created in the master copy. This table may be where the dependencies between workbook parts are maintained, and where changes (e.g., updates) to workbook parts are denoted. When the workbook part is created, its dependencies may be detected and converted to an internal format that expresses a link to the master table and to each workbook part it relies on. When a workbook part is updated, it may retrieve its dependent calculated values from the master copy of the spreadsheet. This master copy may be recalculated on the server, and the latest updates and changes from the workbook part may be propagated back into the master copy by the server.

The library 210 may also have UI to allow the user 204A-B to select a group of workbook parts 214A-C and export them to a new spreadsheet. In this case, the workbook parts 214A-C, and all of their data, may be placed into a new spreadsheet application. Note that the workbook parts 214A-C may be placed each on their own sheet, or share sheets. If the workbook part 214A-C is a sheet (and not an object like a chart) then it may be imported to the new spreadsheet as a new sheet and no other workbook parts need be part of that sheet. If the workbook parts 214A-C that are imported to the new spreadsheet have dependencies on other workbook parts 214A-C that are also being imported to the new spreadsheet, then the dependencies may be adjusted so they point to the new spreadsheet. If the dependencies point to other workbook parts 214A-C that are not being imported, then the user 204A-B may be presented with a choice to break dependencies and import the current cached values, or to maintain the dependent links.

The library 210 may have UI to allow the user 204A-B to select a group of workbook parts 214A-C and export them to a dashboard. In this case, a new web page may be created, and each workbook part 214A-C may be rendered on that web page in a separate web part. The updates, recalculation, and rendering of the dashboard may be handled by a spreadsheet server application, such as Excel Services, for example. All the web parts for each workbook part 214A-C may be created with default settings, or there may be a wizard-like UI to guide the user 204A-B through configuring the dashboard for each workbook part 214A-C. In the simplest case, each workbook part 214A-C may get its own web part, each web part may have default settings, and each web part maybe arranged on the dashboard page randomly. Note that some wizard UI could be created to allow full configuration of the dashboard layout, and web part properties for each web part.

Figure 2:
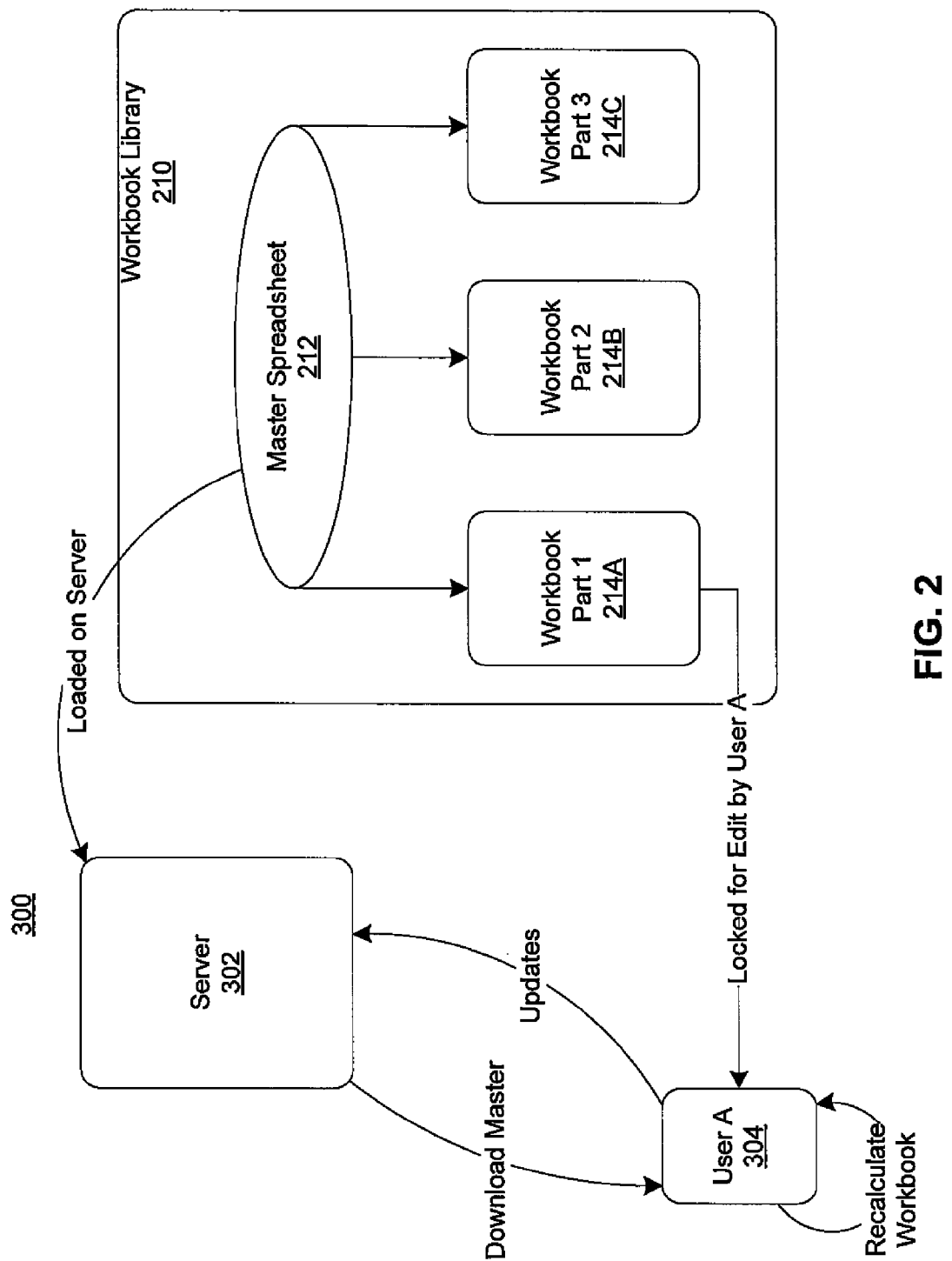
FIG. 2 is a block diagram of a second embodiment of a system for providing spreadsheet workbook part libraries.

In an alternate embodiment, the full master copy may be downloaded to the client application, and the recalculation performed there. FIG. 2 is a block diagram of such an embodiment of a system 300. As shown, a user 304 may edit a workbook part 214A using the client application. Transparently to the user, a copy of the master spreadsheet 212 may be downloaded to the client. The recalculation may be performed on the client, using the downloaded master spreadsheet 212. The workbook part 214A, as affected by the recalculation, may be sent back to the server 302. It should be understood, of course, that keeping the re-calculation on the server has the advantage that it prevents the master copy from needing to be downloaded to the local client machine, thus protecting all of the IP, while still allowing the workbook parts to be calculated and get results in real time.

Figure 3:
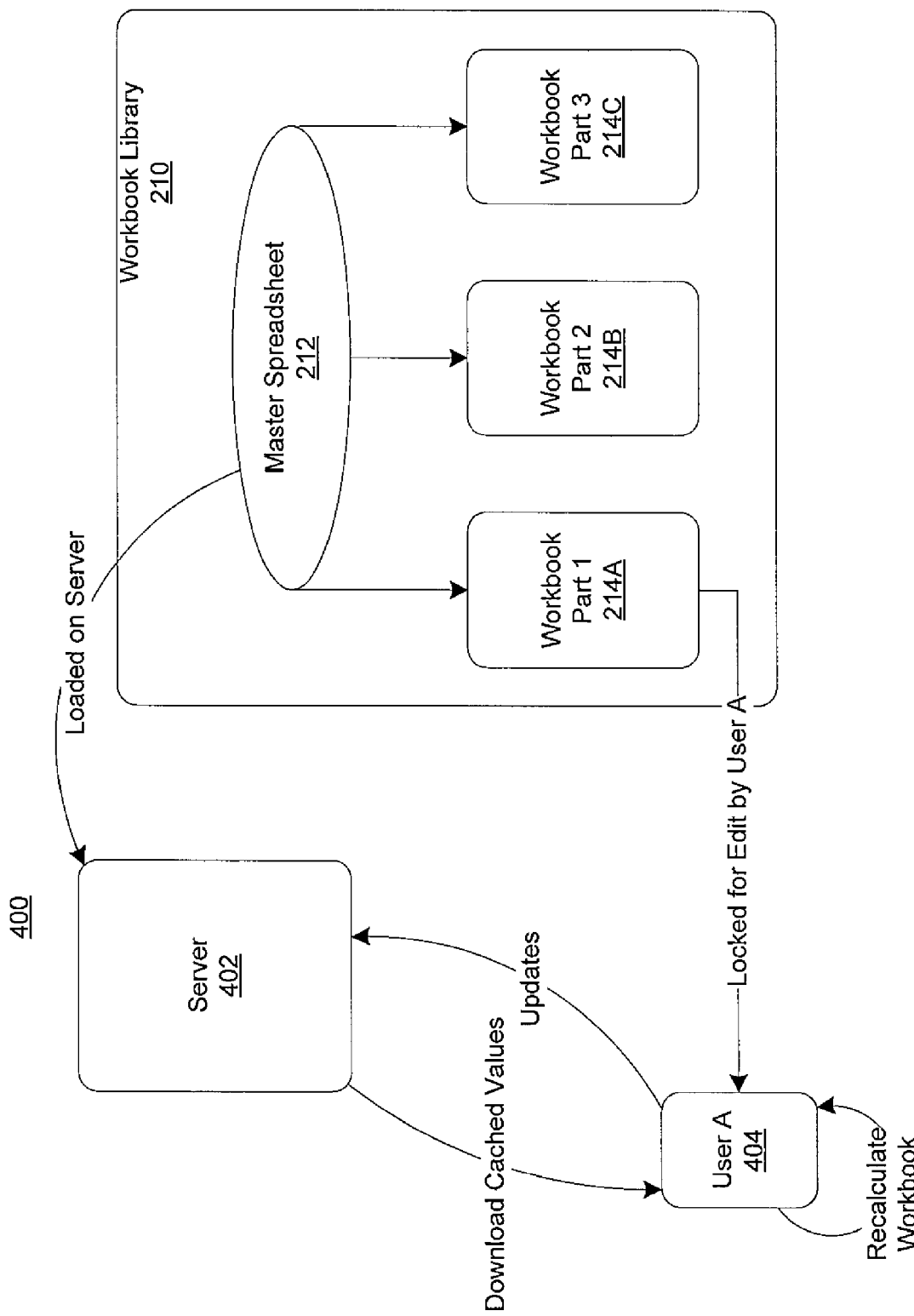
FIG. 3 is a block diagram of a third embodiment of a system for providing spreadsheet workbook part libraries.

FIG. 3 depicts another embodiment of a system 400 for performing a recalculation on one workbook part 214A that has a dependency on another workbook part 214B-C. To recalculate, the workbook part 214A on the client 304 may retrieve cached values from the master spreadsheet 212 (or, alternatively, directly from the workbook part it depends on). That is, the workbook part may retrieve data values from a file stored on the server 402. The file may be a "copy" of the master spreadsheet 212. Thus, rather than using the master spreadsheet 212 for recalculation, relevant data values may be read from a cached file and used for recalculation. Accordingly, the master spreadsheet 212 may not need to be downloaded to the client. Such an approach may involve simpler logic, as a full update and recalculation of the master spreadsheet or other workbook parts may not be required. If a user does not have the permissions needed to access another workbook part, then the dependent calculation may be done using a spreadsheet server application that can enforce that only the results of the calculation are returned from the workbook part the user does not have access to.

Alternatively, recalculation may not be performed by the client application. Rather, the cached values may always be shown. That is, the dependencies need not be updated, but that which is cached may always be used with the workbook part. For example, a workbook part may evaluate dependencies when it is downloaded and opened in the client. The workbook part may get the cached values for all of the dependencies. It should be understood that, in such an embodiment, even if the data on another sheets changes, or a cell that the data on such other sheet depends on changes, the cache value at the time the workbook part is downloaded will be used.

Figure 4:
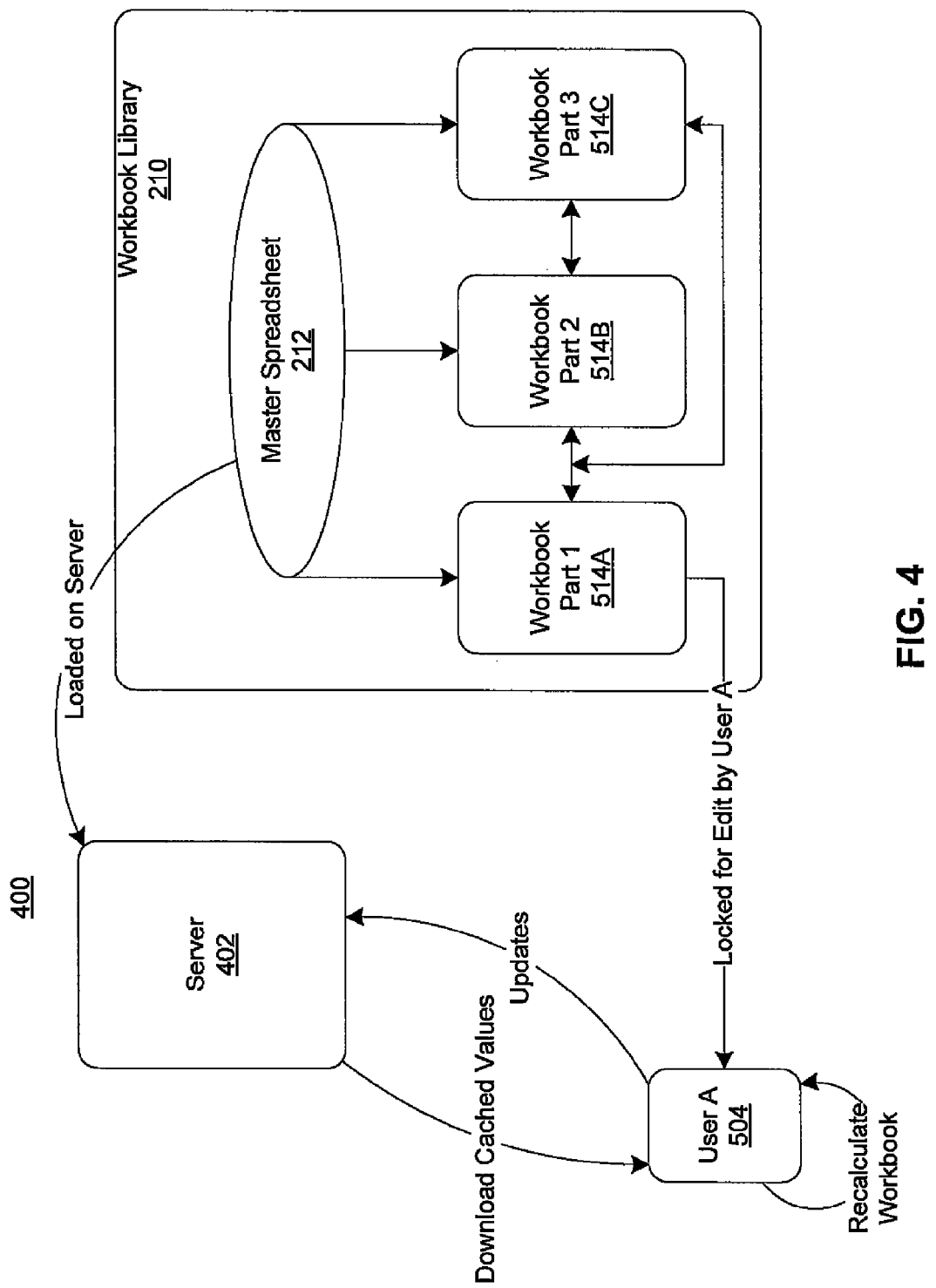
FIG. 4 is a block diagram of a fourth embodiment of a system for providing spreadsheet workbook part libraries.

FIG. 4 is a block diagram of a fourth embodiment of a system 500 for providing spreadsheet workbook part libraries. In such an embodiment, a workbook part 514A may include one or more links to one or more other workbook parts 514B-C on which the workbook part 514A has one or more dependencies. To recalculate, the workbook part 514A may communicate directly with the other workbook parts 514B-C to retrieve the most current data from those workbook parts 514B-C.

Exemplary Computing Arrangement

Figure 5:
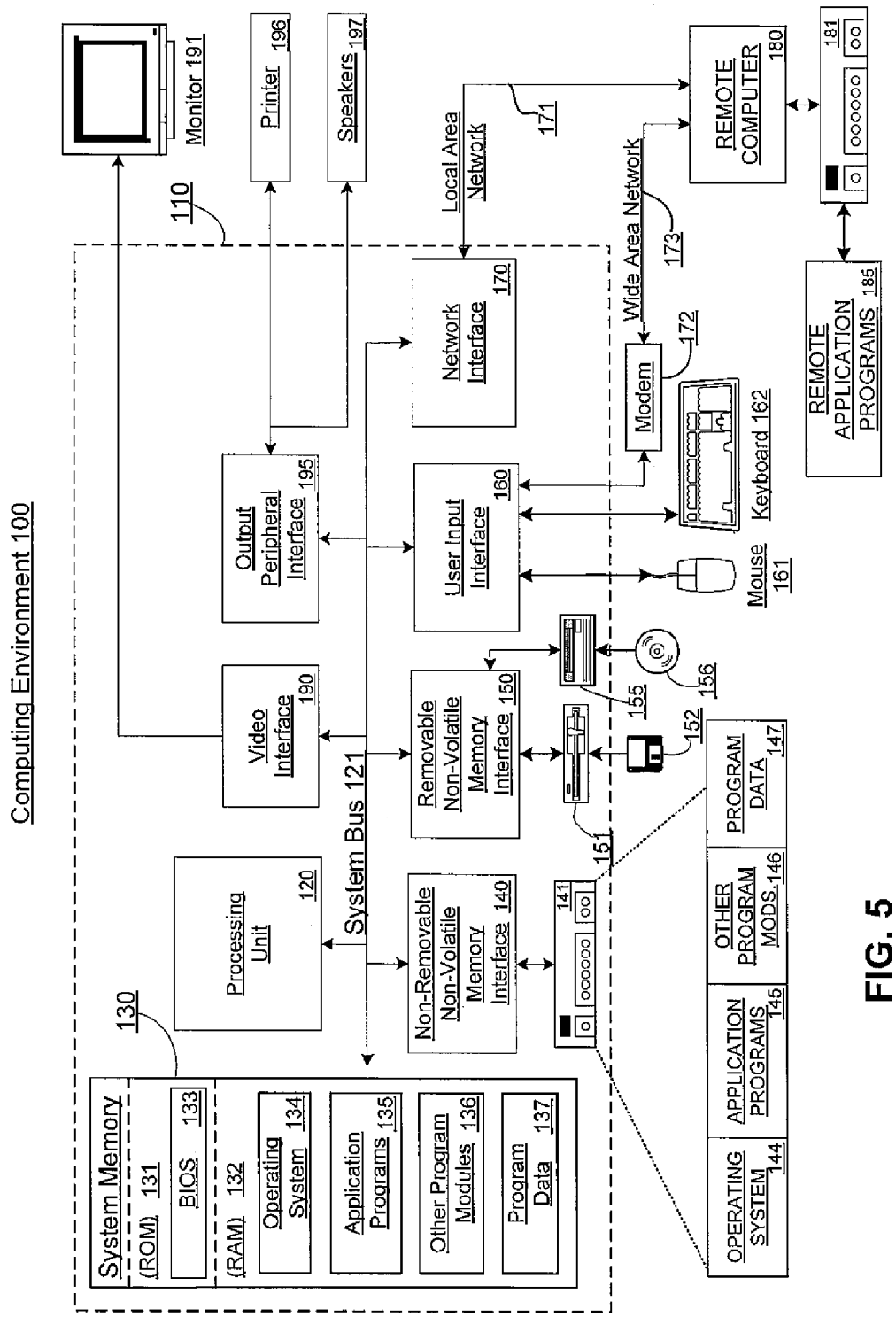
FIG. 5 is a block diagram of an example computing environment in which example embodiments and aspects may be implemented.

FIG. 5 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method comprising:
generating an electronic spreadsheet workbook having a set of data fields;
generating, from the electronic spreadsheet workbook, a workbook part that is separate from the electronic spreadsheet workbook, the workbook part comprising a subset of the set of data fields, the workbook part being independently manageable from the electronic spreadsheet workbook;
storing the workbook part and the electronic spreadsheet workbook separately in a workbook library;
importing the workbook part to a new electronic spreadsheet;
when the workbook part has a dependency to a second workbook part that is not being imported to the new electronic spreadsheet and is independently manageable from the electronic spreadsheet workbook, providing a choice to a user to perform one of breaking the dependency or maintaining the dependency; and
responsive to receiving a selection of the choice from the user to break the dependency, automatically recalculating, without user intervention, the new electronic spreadsheet based on changes to the workbook part resulting from breaking the dependency, wherein breaking the dependency comprises importing cached values from the second workbook part to the new electronic spreadsheet.

2. The method of claim 1, wherein:
the workbook part comprising an encapsulated calculation dependency.

3. The method of claim 2, further comprising:
maintaining, by the workbook library, a master copy of the electronic spreadsheet workbook;
generating, in the master copy, a table that includes a reference to the workbook part;
storing the calculation dependency in the table; and
denoting changes to the workbook part in the table.

4. The method of claim 3, further comprising:
recalculating the master copy of the spreadsheet workbook based on changes to the workbook part.

5. The method of claim 1, further comprising:
locking, by the workbook library, the second workbook part from editing.

6. The method of claim 1, further comprising:
downloading a master copy of the spreadsheet workbook from a server to a client;
recalculating the master copy on the client, based on changes to the workbook part; and
uploading the recalculated master copy of the spreadsheet workbook from the client to the server.

7. The method of claim 1, wherein the second workbook part is stored in the workbook library.

8. The method of claim 1, wherein the workbook part comprises a logically distinct spreadsheet object.

9. The method of claim 8, wherein the logically distinct spreadsheet object is associated with an external data cache, and wherein the external data cache is encapsulated with the workbook part.

10. The method of claim 8, wherein data required to render or manipulate the object travels with the object as part of the workbook part.

11. A computer-readable storage medium that is not a propagating signal, the computer-readable storage medium comprising executable instructions that when executed by a processor cause the processer to effectuate operations comprising:

generating an electronic spreadsheet workbook having a set of data fields; and generating, from the electronic spreadsheet workbook, a workbook part that is separate from the electronic spreadsheet workbook, the workbook part comprising a subset of the set of data fields, the workbook part being independently manageable from the electronic spreadsheet workbook;

storing the workbook part and the electronic spreadsheet workbook separately in a workbook library;

importing the workbook part to a new electronic spreadsheet;

when the workbook part has a dependency to a second workbook part that is not being imported to the new electronic spreadsheet and is independently manageable from the electronic spreadsheet workbook, providing a choice to a user to perform one of breaking the dependency or maintaining the dependency; and responsive to receiving a selection of the choice from the user to break the dependency, automatically recalculating, without user intervention, the new electronic spreadsheet based on changes to the workbook part resulting from breaking the dependency, wherein breaking the dependency comprises importing cached values from the second workbook part to the new electronic spreadsheet.

12. The computer-readable storage medium of claim 11, further comprising:

locking, by the workbook library, the second workbook part from editing.

13. An apparatus comprising:

a processor; and memory coupled to the processor, the memory comprising executable instruction that when executed by the processor cause the processor to effectuate operations comprising:

generating an electronic spreadsheet workbook having a set of data fields;

generating, from the electronic spreadsheet workbook, a workbook part that is separate from the electronic spreadsheet workbook, the workbook part comprising a subset of the set of data fields, the workbook part being independently manageable from the electronic spreadsheet workbook;

storing the workbook part and the electronic spreadsheet workbook separately in a workbook library;

importing the workbook part to a new electronic spreadsheet;

when the workbook part has a dependency to a second workbook part that is not being imported to the new electronic spreadsheet and is independently manageable from the electronic spreadsheet workbook, providing a choice to a user to perform one of breaking the dependency or maintaining the dependency; and responsive to receiving a selection of the choice from the user from the user to break the dependency, automatically recalculating, without user intervention, the new electronic spreadsheet based on changes to the workbook part resulting from breaking the dependency, wherein breaking the dependency comprises importing cached values from the second workbook part to the new electronic spreadsheet.

14. The apparatus of claim 13, the operations further comprising:

generating, from the electronic spreadsheet workbook, the second workbook part.

15. The apparatus of claim 14, wherein operations further comprising:

storing the second workbook part separately from the electronic spreadsheet workbook in the workbook library.

16. The apparatus of claim 13, the operations further comprising:

maintaining, by the workbook library, a master copy of the electronic spreadsheet workbook;

generating, in the master copy, a table that includes a reference to the workbook part;

storing the dependency in the table; and denoting changes to the workbook part in the table.

17. The apparatus of claim 16, the operations further comprising:

recalculating the master copy of the spreadsheet workbook based on changes to the workbook part.

18. The apparatus of claim 13, wherein the workbook part comprises a logically distinct spreadsheet object.

* * * * *